G. W. CARROLL.
Horn-Tip for Cattle.

No. 218,484.  Patented Aug. 12, 1879.

WITNESSES:
C. Neveux
C. Sedgwick

INVENTOR:
G. W. Carroll
BY Munn & Co.
ATTORNEYS.

UNITED STATES PATENT OFFICE.

GEORGE W. CARROLL, OF UNION CITY, PENNSYLVANIA.

IMPROVEMENT IN HORN-TIPS FOR CATTLE.

Specification forming part of Letters Patent No. 218,484, dated August 12, 1879; application filed March 6, 1879.

*To all whom it may concern:*

Be it known that I, GEORGE WHITFIELD CARROLL, of Union City, in the county of Erie and State of Pennsylvania, have invented a new and Improved Horn-Tip for Cattle, of which the following is a specification.

The object of this invention is to enable the tips to be secured to the horns without liability of breaking or otherwise injuring them; and it consists in providing wooden tips incased in metal sleeves, attached to chains on which are elastic rings adapted to fit the tapering horns and yield to their growth, and which are connected together between the horns by a loop, whereby the chains can be taken up or shortened at pleasure, to adapt them to different cattle.

Figure 1:
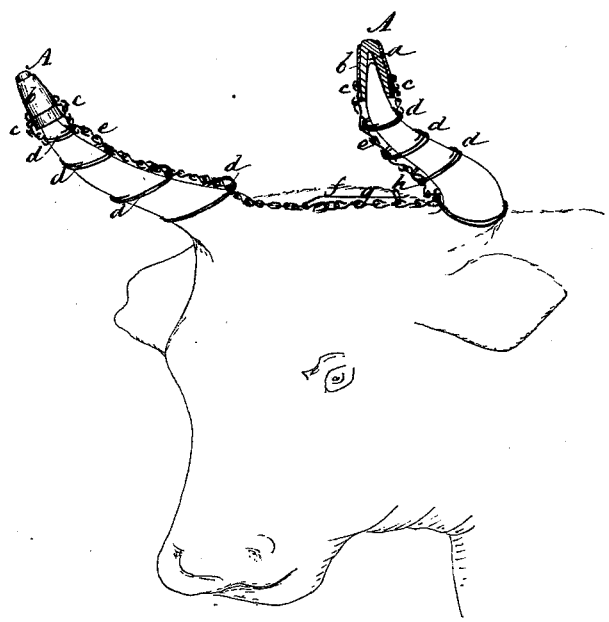
Figure 2:
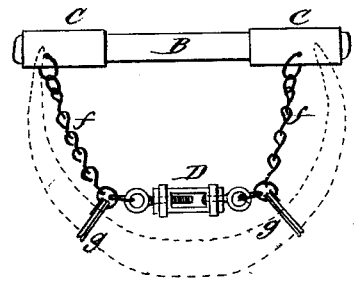

In the accompanying drawings, Figure 1 represents the head and horns of an animal with my improved tip applied to the horns, and Fig. 2 shows another arrangement of the tips.

Referring to the drawings, A A are the conical wooden tips, having conical sockets $a$, in which the points of the horns are placed. These wooden tips are confined in ferrules or sleeves $b$, and to the sleeves are attached, on opposite sides, the short chains $c\ c$, which are attached to a succession of elastic rings, $d$, by a chain, $e$, with a free end extending beyond the last ring of the series.

To the end of one of the chains is attached a hook, $f$, with a long backwardly-extending arm, $g$, which engages a spring-ring, $h$, on the same chain, to which the hook is attached.

The rings $d$ are elastic, so as to conform to the taper of the horn, and also to enable them to yield as the horns grow, and thus avoid injuring them.

The device is applied as follows: The rings are slipped over the horns, the first one down to the base, and the others at the intervals allowed by the chain until all are on, and then the tips are placed over the points of the horns. The free ends of the chains are then drawn together between the horns and secured by the hook $f$. The tips being thus secured to the horns, there is no necessity for their being made very tight; hence there is no liability of injury occuring to the horns, as is usual where screw or riveted tips are used, and as large a tip may be adjusted as desired. So, too, the spring or elastic rings $d$ yield as the horns grow, and thus avoid injuring them. When the tips are applied to the animal the hook may be made to take up the free end of the chain opposite at any point by slipping it through the links and catching it under the ring $h$.

The modification shown in Fig. 2 consists of a wooden bar, B, with metal ferrules C C on the ends, from which chains $f f$ descend and are joined to rings $g\ g$. Holes are made through the metal ferrules and into the wooden bar, to receive the tips of the horns, as clearly shown by the dotted lines, and the ends of the chain are fastened together between the horns by a screw-coupling, D.

Having thus described my invention, I claim as new and desire to secure by Letters Patent—

An improvement in horn-tips for cattle consisting of the wooden tips A, inclosing sleeves or ferrules $b$, chains $c$, elastic rings $d$, and chain $e$, combined, arranged, and adapted to be confined on the horns by the hook $f$, in the manner substantially as described.

GEORGE WHITFIELD CARROLL.

Witnesses:
L. G. BARNES,
JENNIE B. CARROLL.